United States Patent Office 2,792,296
Patented May 14, 1957

2,792,296

PHENYLHYDRAZINOPROPIONITRILES, HERBICIDAL METHOD AND COMPOSITION EMBODYING SAME

Samuel Allen Heininger, Dayton, Ohio, assignor to Monsanto Chemical Company, St. Louis, Mo., a corporation of Delaware No Drawing. Application January 25, 1954,
Serial No. 406,060

8 Claims. (Cl. 71—2.3)

The present invention provides $\beta$-phenylhydrazinopropionitriles as new compounds, a method of producing the same, herbicidal compositions comprising the new compounds, and methods of destroying or preventing plant growth in which methods such compositions are used.

According to the invention, $\beta$-phenylhydrazinopropionitriles are prepared by the addition reaction of phenylhydrazine and acrylonitrile, the reaction taking place according to the scheme:

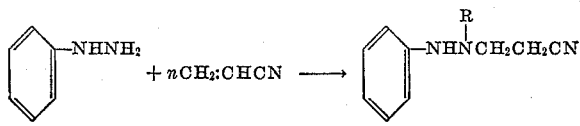

in which R is selected from the class consisting of hydrogen and the radical —CH$_2$CH$_2$CN, and $n$ is an integer of from 1–2.

Depending upon the quantity of acrylonitrile employed as well as upon the reaction conditions used one or two moles of acrylonitrile may react with the phenylhydrazine. Reaction of one mole of the acrylonitrile yields $\beta$-phenylhydrazinopropionitrile, having the formula

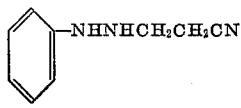

Reaction of two moles of acrylonitrile with one mole of phenylhydrazine gives $\beta,\beta'$-(2-phenylhydrazono)dipropionitrile, having the formula

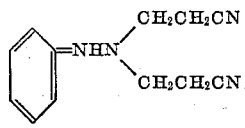

Reaction of the phenylhydrazine and the acrylonitrile may be effected by simply mixing the two reactants, in the presence or absence of an inert diluent or solvent and heating the resulting mixture at a temperature of say, from 50° C. to 200° C. Temperatures of from 80° C. to the refluxing temperature of the reaction mixture generally give optimum yields of the cyanoethylated phenylhydrazines. The reaction proceeds with primary formation of the mono addition compound, i. e., the $\beta$-phenylhydrazinopropionitrile, irrespective of the molar proportion of the acrylonitrile with respect to the phenylhydrazine present in the initial reaction mixture. When the acrylonitrile and the phenylhydrazine are present in equimolar proportions, generally the $\beta$-phenylhydrazinopropionitrile is the predominant reaction product. However, the 1:2 phenylhydrazine-acrylonitrile addition product may be formed even when 1:1 ratio of the reactants is employed, some of the initially formed mono addition product reacting with the acrylonitrile to give the $\beta,\beta'$-(phenylhydrazono)dipropionitrile. When the acrylonitrile is present in the reaction mixture in proportions greater than 1:1, the predominant product may be $\beta,\beta'$-(phenylhydrazono)dipropionitrile, depending upon the reaction time and temperature. The addition reaction of phenylhydrazine and acrylonitrile may thus be stated to result in compounds of varying degrees of cyanoethylation or mixtures of such compounds. The substantially pure $\beta$-phenylhydrazinopropionitrile is readily recovered from the reaction product, e. g., by distillation, whereby any $\beta,\beta'$-(phenylhydrazono)dipropionitrile which is formed comprises the distillation residue. For many applications, separation of the cyanoethylation products is not necessary, both the phenylhydrazinopropionitrile and the $\beta,\beta'$-(phenylhydrazono)dipropionitrile possessing general utility as biological toxicants.

Because phenylhydrazine adds easily and smoothly to the acrylonitrile no particular precautions need be observed in conducting the present addition reaction. Inert diluents or solvents may be employed, if desired, particularly in order to effect predominantly 1:1 addition. Such solvents or diluents may be e. g., ether, nitrobenzene, dioxane, etc. An acidic catalyst may or may not be employed. As examples of useful catalysts may be mentioned acid-reacting metallic salts such as cuprous or cupric, stannous or stannic, ferrous or ferric acetates, sulfates or chlorides, organic or inorganic acids such as sulfuric, phosphoric, acetic or oxalic acid, etc.

$\beta$-Phenylhydrazinopropionitrile and $\beta,\beta'$-(phenylhydrazono)dipropionitrile are stable, rather high-boiling, yellowish, viscous liquids which may be used for a variety of industrial and agricultural purposes. They are particularly valuable as herbicides. When employed as contact sprays, herbicidal compositions comprising the $\beta$-phenylhydrazinopropionitrile as the herbicidally effective ingredient are characterized by a high degree of selective efficiency in that even in very low concentration, e. g., in a concentration of as low as 0.3 percent, they severely injure narrow-leafed plant growth, but have no adverse effect on broad-leafed plants at the same or higher concentrations. The present nitriles may thus be employed very advantageously for ridding truck crop fields, e. g., strawberries, beans, etc., of invading grasses.

$\beta$-Phenylhydrazinopropionitrile is also an extremely efficient pre-emergent herbicide. When applied to soil surfaces in concentrations of as low as 50 lbs. of the nitrile per acre, it prevents germination and growth of both broad-leafed and narrow-leafed plants. When admixed with soil, $\beta$-phenylhydrazinopropionitrile also serves as a soil-fumigant, functioning as a very effective nematocide.

Herbicidal compositions containing $\beta$-phenylhydrazinopropionitrile, $\beta,\beta'$-(phenylhydrazono)dipropionitrile, or mixtures of the same are readily obtained by first preparing a solution thereof in an organic solvent and then adding the resulting solution to water containing an emulsifying agent to form an emulsion. Because of the very high herbicidal efficiency of the present nitriles, they are present in the herbicidal composition in only very small concentrations, for example, in concentrations of from 0.1 percent to 2 percent by weight of the total weight of the emulsion. Emulsifying agents which may be employed are those customarily used in the art for the preparation of oil-in-water emulsions. The word "oil" as used here, denotes any water-insoluble organic liquid. Examples of emulsifying agents which may be used include alkylbenzenesulfonates, long chained polyalkylene glycols, long chained alkyl sulfosuccinates, etc.

Examples of organic solvents which may be used in preparing the emulsions include hydrocarbon liquids such as kerosene, hexane, benzene, and toluene; fatty oils, nitro compounds such as nitrobenzene or nitrobutane, chloro compounds such as carbon tetrachloride or the chlorobenzenes, ketones such as cyclohexanone or methyl ethyl ketone, etc.

The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., oils, cinders, etc.

The present invention is further illustrated, but not limited, by the following examples:

*Example 1*

To 100 g. of phenylhydrazine there was added 70 g. of acrylonitrile and 3 ml. of glacial acetic acid. After thorough mixing at room temperature, the resulting mixture was refluxed for seven hours, with an initial pot-temperature of 98° C. and a final pot temperature of 150° C. during the refluxing period. After being allowed to stand at room temperature overnight, the reaction mixture was distilled in vacuo to give a fraction, B. P. 150–180° C./1 mm. Redistillation of this fraction gave the substantially pure phenylhydrazinopropionitrile, B. P. 145–160° C./0.5 mm., $n_D^{25}$ 1.5832, and analyzing as follows:

|  | Found | Calcd. for $C_9H_{11}N_3$ |
|---|---|---|
| Percent C | 65.50 | 67.0 |
| Percent H | 6.41 | 6.87 |
| Percent N | 24.03 | 26.13 |

Material boiling above 160° C./0.5 mm. comprised $\beta,\beta'$-(phenylhydrazono)dipropionitrile.

*Example 2*

Spray testing of the present herbicidal compositions was conducted as follows:

A cyclohexanone solution of the $\beta$-phenylhydrazinopropionitrile of Example 1 and an emulsifying agent were added to water, the quantity of solution employed being calculated to give emulsions containing 1.0 percent and 0.3 percent by weight, respectively, of said nitrile, based on the weight of the total emulsion. The quantity of emulsifying agent used was 0.2 percent by weight, based on the weight of the total emulsion. Said emulsifying agent comprised a mixture of a polyalkyleneglycol derivative and an alkylbenzenesulfonate.

Three week old corn and bean plants were sprayed with the respective emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank specimens" of each plant were then allowed to remain under standard conditions of sunlight and watering for a period of one week. At the end of that time the sprayed plants were compared with the untreated plants in order to determine the extent of injury, if any. Corn plants which had been sprayed with the 1.0 percent emulsion were completely dead and the leaves thereof dried, whereas the bean plants were only very slightly harmed. Corn plants which had been sprayed with the 0.3 percent emulsion were severely injured, whereas the bean plants were completely unaffected at this concentration. Control plants, i. e., untreated plants allowed to stand under the same conditions of sunlight and water for the same length of time were in excellent condition as well as those which had been sprayed with a mixture consisting of water, 10 percent by weight of cyclohexanone, the organic solvent employed above, and 0.2 percent by weight of the emulsifying agent employed above.

*Example 3*

Another method of testing for herbicidal efficiency of a chemical involves noting the effects on seed germination and plant growth which may be evidenced by spraying soil surfaces. This test, commonly known a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of radish, wild oats, beet, cheat grass, mustard, rye grass and morning glory seeds, respectively, were prepared. The surface soil of the seeded boxes was then sprayed, respectively, with the 1.0 percent phenylhydrazinopropionitrile emulsion of Example 2. The quantity of the emulsion which was applied was calculated to correspond to 50 lbs. of the nitrile per acre, 9.1 cc. of the 1.0 percent emulsion per 25 sq. in. of surface soil being calculated to correspond to 50 lbs. of the chemical per acre. The sprayed boxes as well as similar seeded but unsprayed boxes were then maintained at standard conditions of temperature and watering for a period of two weeks. At the end of that time the number of healthy seedlings in each box was counted. Thus the number of non-emerging and damaged seedlings was obtained by difference. This difference was designated as "X." "Percent phytotoxicity" was determined by the ratio of "X" to the number of healthy seedlings in the controls. There was evidenced a 46–70 percent phytotoxicity to beets and a 71–100 percent phytotoxicity to the other specimens herein employed, i. e., the radish, wild oats, cheat grass, mustard, rye grass, and morning glory.

While $\beta$-phenylhydrazinopropionitrile is most advantageously employed as a herbicide by incorporating it into an aqueous emulsion as herein described, it may also be employed in other plant-destroying methods. Thus it may be incorporated into solid carriers such as clay, talc, pumice and bentonite to give herbicidal compositions which may be applied to living plants or to surfaces which are to be freed from plant growth. The nitrile may also be mixed with liquid or solid agricultural pesticides, e. g., insecticides and fungicides. While solutions of the nitrile in organic solvents may be employed for preventing and destroying plant growth, I have found that the emulsions possess an improved tendency to adhere to the treated surfaces and that less of the active ingredient is required to give comparable herbicidal efficiency.

What I claim is:

1. A nitrile having the formula

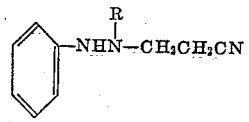

in which R is selected from the class consisting of hydrogen and the radical —CH₂CH₂CN.

2. $\beta$-Phenylhydrazinopropionitrile.

3. A herbicidal composition comprising an oil-in-water emulsion containing in phytotoxic concentration, as the active ingredient, a nitrile having the formula

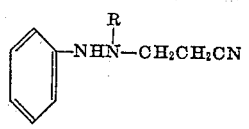

in which R is selected from the class consisting of hydrogen and the radical —CH₂CH₂CN.

4. A herbicidal composition comprising an oil-in-water emulsion containing a phytotoxic concentration of $\beta$-phenylhydrazinopropionitrile as the active ingredient.

5. The method of destroying undesirable plants which comprises applying to said plants a toxic quantity of a herbicidal composition comprising a nitrile having the formula

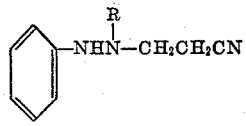

in which R is selected from the class consisting of hydrogen and the radical —CH₂CH₂CN.

6. The method of destroying undesirable plants which comprises applying to said plants a toxic quantity of a herbicidal composition comprising β-phenylhydrazinopropionitrile as the active ingredient.

7. The method of preventing plant growth which comprises applying to media normally supporting said growth a phytotoxic amount of a herbicidal composition comprising as the active ingredient a nitrile having the formula

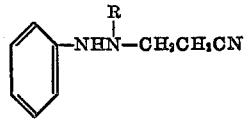

in which R is selected from the class consisting of hydrogen and the radical —CH₂CH₂CN.

8. The method of preventing plant growth which comprises applying to media normally supporting said growth a phytotoxic amount of a herbicidal composition comprising β-phenylhydrazinopropionitrile as the active ingredient.

References Cited in the file of this patent

UNITED STATES PATENTS

| | | |
|---|---|---|
| 1,992,615 | Hoffman et al. | Feb. 26, 1935 |
| 2,579,580 | Howk et al. | Dec. 25, 1951 |

FOREIGN PATENTS

| | | |
|---|---|---|
| 885,341 | France | May 24, 1943 |

OTHER REFERENCES

Reissert: Beilstein's "Handbuch der Organischen Chemie," 4th edition, vol. 15 (1932), page 323.